United States Patent
van den Oord et al.

(10) Patent No.: US 11,568,207 B2
(45) Date of Patent: Jan. 31, 2023

(54) LEARNING OBSERVATION REPRESENTATIONS BY PREDICTING THE FUTURE IN LATENT SPACE

(71) Applicant: DeepMind Technologies Limited, London (GB)

(72) Inventors: Aaron Gerard Antonius van den Oord, London (GB); Yazhe Li, London (GB); Oriol Vinyals, London (GB)

(73) Assignee: DeepMind Technologies Limited, London (GB)

(*) Notice: Subject to any disclaimer, the term of this patent is extended or adjusted under 35 U.S.C. 154(b) by 644 days.

(21) Appl. No.: 16/586,323

(22) Filed: Sep. 27, 2019

(65) Prior Publication Data
US 2020/0104679 A1  Apr. 2, 2020

Related U.S. Application Data

(60) Provisional application No. 62/737,878, filed on Sep. 27, 2018.

(51) Int. Cl.
*G06N 3/08* (2006.01)
*G06N 3/04* (2006.01)
(Continued)

(52) U.S. Cl.
CPC .......... *G06N 3/0454* (2013.01); *G06F 17/16* (2013.01); *G06K 9/6215* (2013.01); *G06N 3/0481* (2013.01); *G06N 3/08* (2013.01)

(58) Field of Classification Search
CPC . G05D 1/0221; G06F 16/24554; G06F 17/16; G06F 40/40; G06F 7/16;
(Continued)

(56) References Cited

U.S. PATENT DOCUMENTS 10,713,593 B2 * 7/2020 Chen .................. G06N 3/063
11,106,973 B2 * 8/2021 Shi ..................... G06N 3/04
(Continued)

OTHER PUBLICATIONS

Abbeel et al., "Apprenticeship learning via inverse reinforcement learning,"Proceedings of the twenty-first international conference on Machine learning, Jul. 2044, 8 pages.
(Continued)

*Primary Examiner* — Gerald Gauthier
(74) *Attorney, Agent, or Firm* — Fish & Richardson P.C.

(57) ABSTRACT

Methods, systems, and apparatus, including computer programs encoded on a computer storage medium, for training an encoder neural network that is configured to process an input observation to generate a latent representation of the input observation. In one aspect, a method includes: obtaining a sequence of observations; for each observation in the sequence of observations, processing the observation using the encoder neural network to generate a latent representation of the observation; for each of one or more given observations in the sequence of observations: generating a context latent representation of the given observation; and generating, from the context latent representation of the given observation, a respective estimate of the latent representations of one or more particular observations that are after the given observation in the sequence of observations.

20 Claims, 2 Drawing Sheets

(51) Int. Cl.
G06F 17/16 (2006.01)
G06K 9/62 (2022.01)

(58) Field of Classification Search
CPC ..... G06F 7/483; G06F 16/245; G06K 9/6215; G06K 9/6234; G06K 9/6267; G06K 9/6273; G06K 9/6271; G06K 9/6272; G06N 3/006; G06N 3/02; G06N 3/04; G06N 3/0445; G06N 3/0454; G06N 3/0472; G06N 3/0481; G06N 3/08; G06N 3/084; G06N 3/088; G06N 7/005; G06N 20/00; G06N 3/063; G06N 20/20; G06Q 20/40; G06Q 20/52; G06V 10/147; G06V 10/82; F24F 11/30; G08B 25/016
USPC .......................... 382/294; 704/9, 232; 706/15
See application file for complete search history.

(56) References Cited

U.S. PATENT DOCUMENTS

| | | | |
|---|---|---|---|
| 2005/0114278 | A1 | 5/2005 | Saptharishi et al. |
| 2008/0240616 | A1* | 10/2008 | Haering ............... G06V 10/147 382/294 |
| 2012/0150531 | A1* | 6/2012 | Bangalore ............... G06F 40/40 704/E11.001 |
| 2014/0025613 | A1 | 1/2014 | Ponulak |
| 2015/0019214 | A1* | 1/2015 | Wang ........................ G06N 3/02 704/232 |
| 2015/0276238 | A1* | 10/2015 | Matsuoka ................ F24F 11/30 700/278 |
| 2017/0132512 | A1* | 5/2017 | Ioffe ..................... G06K 9/6272 |
| 2017/0185872 | A1* | 6/2017 | Chakraborty .......... G06V 20/52 |
| 2017/0372202 | A1* | 12/2017 | Ginsburg ............. G06N 3/0454 |
| 2018/0101766 | A1* | 4/2018 | He .......................... G06N 3/084 |
| 2018/0157661 | A1* | 6/2018 | Zoldi ................ G06F 16/24554 |
| 2018/0211152 | A1* | 7/2018 | Migacz ..................... G06N 3/08 |
| 2018/0336472 | A1* | 11/2018 | Ravi ....................... G06F 17/16 |
| 2019/0122106 | A1* | 4/2019 | Lee ........................... G06F 7/483 |
| 2019/0156196 | A1* | 5/2019 | Zoldi ..................... G06Q 20/40 |
| 2019/0171929 | A1* | 6/2019 | Abadi ...................... G06N 3/084 |
| 2019/0228310 | A1* | 7/2019 | Inagaki ................. G06K 9/6271 |
| 2019/0251445 | A1* | 8/2019 | Movshovitz-Attias ...... G06N 3/0445 |
| 2019/0258918 | A1 | 8/2019 | Wang et al. |
| 2019/0258938 | A1* | 8/2019 | Mnih .................... G06N 3/0445 |
| 2019/0303703 | A1* | 10/2019 | Kumar ..................... G06N 3/08 |
| 2019/0311257 | A1* | 10/2019 | Chang ..................... G06N 3/04 |
| 2019/0332922 | A1 | 10/2019 | Nachunn et al. |
| 2019/0354689 | A1* | 11/2019 | Li ............................ G06N 3/04 |
| 2019/0370638 | A1* | 12/2019 | Green ................... G06N 3/0454 |
| 2020/0065560 | A1 | 2/2020 | Kaneko et al. |
| 2020/0074305 | A1* | 3/2020 | Cao ......................... G06N 3/084 |
| 2020/0089246 | A1 | 3/2020 | McGill et al. |
| 2020/0089772 | A1* | 3/2020 | Gomez ..................... G06N 3/08 |
| 2020/0090043 | A1* | 3/2020 | Mnih ........................ G06N 3/08 |
| 2020/0104679 | A1* | 4/2020 | van den Oord ........ G06N 3/088 |
| 2020/0104680 | A1 | 4/2020 | Reed et al. |
| 2020/0174490 | A1* | 6/2020 | Ogale .................. G05D 1/0221 |
| 2020/0183047 | A1 | 6/2020 | Denli et al. |
| 2020/0234468 | A1* | 7/2020 | Lerchner ................ G06N 3/084 |
| 2021/0004677 | A1* | 1/2021 | Menick .................. G06N 20/20 |
| 2021/0097401 | A1* | 4/2021 | Ramalho ................ G06N 3/084 |
| 2021/0150357 | A1 | 5/2021 | Karras et al. |
| 2021/0158162 | A1 | 5/2021 | Hafer et al. |
| 2021/0287297 | A1* | 9/2021 | Hayward ............. G08B 25/016 |
| 2022/0076099 | A1 | 3/2022 | Sernnanet et al. |

OTHER PUBLICATIONS

Arjovsky et al., "Towards principled methods for training generative adversarial network," arXiv, Jan. 2017, 17 pages.
Arjovsky et al., "Wasserstein generative adversarial networks," International conference on machine learning, Jul. 2017, 10 pages.
Atal et al., "Adaptive predictive coding of speech signals," Bell System Technical Journal, Oct. 1970, 14 pages.
Aytar et al., "Playing hard exploration games by watching youtube," Advances in Neural Information Processing Systems, Dec. 2018, 12 pages.
Ba et al., "Layer normalization," arXiv, Jul. 2016, 14 pages.
Bakker et al.,"Robot see, robot do: An overview of robot imitation," AISB96 Workshop on Learning in Robots and Animals, Apr. 1996, 10 pages.
Baram et al., "End-to-end differentiable adversarial imitation learning," Proceedings of the 34th International Conference on Machine Learning—vol. 70, Aug. 2017, 10 pages.
Barth-Maron et al., "Distributed distributional deterministic policy gradients," arXiv, Apr. 2018, 16 pages.
Beattie et al., "Deepmindlab," arXiv, Dec. 2016, 11 pages.
Belghazi et al., "Mine: Mutual information neural estimation," arXiv, Jun. 2018, 18 pages.
Bellemare et al., "A distributional perspective on reinforcement learning," arXiv, Jul. 2017, 19 pages.
Bengio et al., "Adaptive importance sampling to accelerate training of a neural probabilistic language model," IEEE Transactions on Neural Networks, Feb. 2008, 31 pages.
Cho et al., "Learning phrase representations using rnn encoderdecoder for statistical machine translation," arXiv, Sep. 2014, 15 pages.
Chopra et al., "Learning a similarity metric discriminatively, with application to face verification," CVPR, Jun. 2005, 8 pages.
Clevert et al., "Fast and accurate deep network learning by exponential linear units (elus)," arXiv, Feb. 2016, 14 pages.
Doersch et al., "Multi-task Self-Supervised Visual Learning," Proceedings of the IEEE International Conference on Computer Vision, Aug. 2017,13 pages.
Doersch et al., "Unsupervised visual representation learning by context prediction," Proceedings of the IEEE International Conference on Computer Vision, Dec. 2015, 9 pages.
Donahue et al., "Adversarial feature learning," arXiv, Apr. 2017, 18 pages.
Duan et al., "One-shot imitation learning," Advances in neural information processing systems, Dec. 2017, 12 pages.
Elias, "Predictive coding—I," IRE Transactions on Information Theory, Mar. 1955, 9 pages.
Espeholt et al., "IMPALA: Scalable Distributed Deep-RL with Importance Weighted Actor-Learner Architectures," arXiv, Jun. 2018, 22 pages.
Finn et al., "A connection between generative adversarial networks, inverse reinforcement learning, and energy-based models," arXiv, Nov. 2016, 10 pages.
Firm et al., "One-shot visual imitation learning via meta-learning," arXiv, Sep. 2017, 12 pages.
Friston, "A theory of cortical responses," Philosophical transactions of the Royal Society B: Biological sciences, Apr. 2005, 22 pages.
Fu et al., "Learning robust rewards with adversarial inverse reinforcement learning," arXiv, Oct. 2017, 15 pages.
Goodfellow et al., "Generative adversarial nets," Advances in neural information processing systems, Dec. 2014, 9 pages.
Gutmann et al., "Noise-contrastive estimation: A new estimation principle for unnormalized statistical models," Proceedings of the Thirteenth International Conference on Artificial Intelligence and Statistics, Mar. 2010, 8 pages.
He et al., Identity mappings in deep residual networks, arXiv. Jul. 2016, 15 pages.
Hester et al., "Deep q-learning from demonstrations," Thirty-Second AAAI Conference on Artificial Intelligence, Apr. 2018, 8 pages.
Hinton et al., "Deep neural networks for acoustic modeling in speech recognition," IEEE Signal processing magazine 29, Nov. 2012, 16 pages.
Hinton et al., "Neural Networks for Machine Learning Lecture 6a Overview of mini—batch gradient descent," UT Lectures from the course Neural Networks for Machine Learning, 2012, 31 pages.
Ho et al., "Generative adversarial imitation learning," Advances in neural information processing systems, Dec. 2016.
Horgan et al., "Distributed prioritized experience replay," arXiv, Mar. 2018, 19 pages.

(56) References Cited

OTHER PUBLICATIONS

Hosu et al., "Playing atari games with deep reinforcement learning and human checkpoint replay," arXiv, Jul. 2016, 6 pages.
Hu et al., "Mining and summarizing customer reviews," Proceedings of the tenth ACM SIGKDD international conference on Knowledge discovery and data mining, Apr. 2004, 10 pages.
Hyvarinen et al., "Unsupervised feature extraction by time-contrastive learning and nonlinear ICA," Advances in Neural Information Processing Systems, Dec. 2016, 9 pages.
Ioffe et al., "Batch normalization: Accelerating deep network training by reducing internal covariate shift," arXiv, Mar. 2015, 11 pages.
Jozefowicz et al., "Exploring the Limits of Language Modeling," arXiv, Feb. 2016, 11 pages.
Kingma et al., "Adam: A method for stochastic optimization," arXiv, Jan. 2017, 15 pages.
Kiros et al., "Skip-thought vectors," Advances in neural information processing systems, Dec. 2015, 9 pages.
Kostrikov et al., "Discriminator-Actor-Critic: Addressing sample inefficiency and reward bias in inverse reinforcement learning," arXiv, Oct. 2018, 14 pages.
Krizhevsky et al., "Imagenet classification with deep convolutional neural network," Advances in neural information processing systems, Dec. 2012, 9 pages.
Le et al., "Distributed representations of sentences and document," International conference on machine learning, Jan. 2014, 9 pages.
Li et al., "Infogail: Interpretable imitation learning from visual demonstrations," Advances in Neural Information Processing Systems, Dec. 2017, 11 pages.
Li et al., "Learning question classifiers," Proceedings of the 19th international conference on Computational linguistics—vol. 1, Aug. 24-Sep. 1, 2002, 7 pages.
Lillicrap et al., "Continuous control with deep reinforcement learning." arXiv, Sep. 2015, 14 pages.
Maaten et al., "Visualizing data using t-SNE," Journal of machine learning research, Nov. 2008, 27 pages.
Mikolov et al., "Efficient estimation of word representations in vector space," arXiv, Sep. 2013, 12 pages.
Miyamoto et al., "A kendama learning robot based on bi-directional theory," Neural Networks Nov. 9, 1996, 22 pages.
Mnih et al., "A fast and simple algorithm for training neural probabilistic language models," arXiv, Jun. 2012, 8 pages.
Mnih et al., "Asynchronous methods for deep reinforcement learning," International conference on machine learning, Jun. 2016, 10 pages.
Ng et al., "Algorithms for inverse reinforcement learning," Icml, Jun. 2000, 8 pages.
Noroozi et al., "Unsupervised learning of visual representations by solving jigsaw puzzles," arXiv, Aug. 2017, 19 pages.
Oord et al., "Conditional image generation with pixelcnn decoders," Advances in neural information processing systems, Dec. 2016, 9 pages.
Oord et al., "Pixel recurrent neural networks," arXiv, Aug. 2016, 11 pages.
Oord et al., "Representation learning with contrastive predictive coding," arXiv, Jan. 2019, 13 pages.
Oord et al., "Wavenet: A generative model for raw audio," arXiv, Sep. 2016, 15 pages.
Panayotov et ah, "Librispeech: an asr corpus based on public domain audio books," 2015 IEEE International Conference on Acoustics, Speech and Signal Processing (ICASSP), Apr. 2015, 5 pages.
Pang et al., "A sentimental education: Sentiment analysis using subjectivity summarization based on minimum cuts," arXiv, 8 pages.
Pang et al., "Seeing stars: Exploiting class relationships for sentiment categorization with respect to rating scales," arXiv, Jun. 2005, 11 pages.

Pohlen et al., "Observe and look further: Achieving consistent performance on atari," arXiv, May 2018, 19 pages.
Pomerleau et al., "Alvinn: An autonomous land vehicle in a neural network," Advances in neural information processing systems, Jan. 1989, 9 pages.
Povey et al., "The kaldi speech recognition toolkit," IEEE 2011 workshop on automatic speech recognition and understanding, Dec. 2011, 4 pages.
Radford et al., "Learning to Generate Reviews and Discovering Sentiment," arXiv, Apr. 2017, 9 pages.
Rao et al., "Predictive coding in the visual cortex: a functional interpretation of some extra-classical receptive-field effects," Nature neuroscience, Jan. 1999, 9 pages.
Russakovsky et al., "ImageNet Large Scale Visual Recognition Challenge," arXiv, Jan. 2015, 43 pages.
Schaal et al., "Learning from demonstration," Advances in neural information processing systems, 1997, 7 pages.
Schaul et al., "Prioritized experience replay," arXiv, Feb. 2016, 21 pages.
Schroff et al., "FaceNet: A unified embedding for face recognition and clustering," Proceedings of the IEEE conference on computer vision and pattern recognition, Jun. 2015, 9 pages.
Sermanet et al., "Time-contrastive networks: Self-supervised learning from video," arXiv, Mar. 2018, 15 pages.
Silver et al., "Deterministic policy gradient algorithms," Proceedings of Machine Learning Research, Jun. 2014, 9 pages.
Sutskever et al., "Sequence to sequence learning with neural networks," Advances in neural infonnation processing systems, Dec. 2014, 9 pages.
Sutton et al., "Reinforcement learning: An introduction," MIT press, Oct. 2018, 10 pages.
Tassa et al., "Deepmind control suite," arXiv, Jan. 2018, 24 pages.
Ulyanov et al., "Instance normalization: the missing ingredient for fast stylization," arXiv, Nov. 2017, 6 pages.
Vaswani et al., "Attention is all you need," Advances in neural infonnation processing system, Dec. 2017, 11 pages.
Vecerik et al., "Leveraging demonstrations for deep reinforcement learning on robotics problems with sparse rewards," arXiv, 10 pages.
Vinyals et al., "Show and tell: A neural image caption generator," Proceedings of the IEEE conference on computer vision and pattern recognition, Dec. 2015, 9 pages.
Wang et al., "Baselines and bigrams: Simple, good sentiment and topic classification," Proceedings of the 50th annual meeting of the association for computational linguistics: Short papers—vol. 2, Jul. 2012, 5 pages.
Wang et al., "Unsupervised Learning of Visual Representations using Videos," arXiv, Oct. 2015, 9 pages.
Weinberger et al., "Distance metric learning for large margin nearest neighbor classification," Journal of Machine Learning Research 10, 38 pages.
Wiebe et al., "Annotating expressions of opinions and emotions in language," arXiv, May 2005, 54 pages.
Wiskott et al., "Slow feature analysis: Unsupervised learning of invariances," Neural computation, Apr. 2002, 56 pages.
Zhang et al., "Colorful image colorization," arXiv, Oct. 2016, 29 pages.
Zhao et al., "Self-adaptive hierarchical sentence model," Twenty-Fourth International Joint Conference on Artificial Intelligence, Jun. 2015, 8 pages.
Zhu et al., "Aligning books and movies: Towards story-like visual explanations by watching movies and reading books," Proceedings of the IEEE international conference on computer vision, Dec. 2015, 9 pages.
Zhu et al., "Reinforcement and imitation learning for diverse visuomotor skills," arXiv, May 2018, 12 pages.
Ziebart et al., "Maximum entropy inverse reinforcement learning," AAAI, Jul. 2008, 6 pages.

* cited by examiner

LEARNING OBSERVATION REPRESENTATIONS BY PREDICTING THE FUTURE IN LATENT SPACE

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a system implemented as computer programs on one or more computers in one or more locations that can train an encoder neural network to generate latent representations of observations that robustly represent generic features in the observations without being specialized towards solving a single task.

According to a first aspect there is provided a method performed by one or more data processing apparatus for training an encoder neural network having a set of encoder neural network parameters and that is configured to receive an input observation and to process the input observation in accordance with the encoder neural network parameters to generate a latent representation of the input observation. The method includes obtaining a sequence of observations. For each observation in the sequence of observations, the method includes processing the observation using the encoder neural network in accordance with current values of the encoder neural network parameters to generate a latent representation of the observation.

For each of one or more given observations in the sequence of observations, the method includes generating, from the latent representation of the given observation and the latent representations of one or more observations that precede the given observation in the sequence of observations, a context latent representation of the given observation which jointly summarizes the latent representation of the given observation and the latent representations of the one or more observations that precede the given observation in the sequence of observations. The method includes generating, from the context latent representation of the given observation, a respective estimate of the latent representations of one or more particular observations that are after the given observation in the sequence of observations. A gradient of a loss function is determined with respect to the current values of the encoder neural network parameters, where for each of the one or more given observations, the loss function characterizes an accuracy of the respective estimates of the latent representations of the one or more particular observations that are after the given observation in the sequence of observations. The current values of the encoder neural network parameters are updated using the gradient.

In some implementations, the sequence of observations includes a sequence of segments of an audio waveform.

In some implementations, the sequence of observations includes a sequence of regions of a given image or a sequence of respective images.

In some implementations, the sequence of observations includes a sequence of sentences in a natural language.

In some implementations, the encoder neural network is configured for use by a reinforcement learning system to generate latent representations of input observations of an environment which are used to select actions to be performed by the reinforcement learning agent to interact with the environment.

In some implementations, the encoder neural network includes one or more convolutional neural network layers, and the latent representation of an observation is a compressed representation of the observation.

In some implementations, generating, from the context latent representation of the given observation, a respective estimate of the latent representations of one or more particular observations that are after the given observation in the sequence of observations includes, for each particular observation, identifying a respective prediction parameter matrix based on a number of observations separating the given observation and the particular observation in the sequence of observations. A product is determined between the context latent representation of the given observation and the prediction parameter matrix.

In some implementations, the loss function is a noise contrastive estimation loss function.

In some implementations, determining a gradient of the loss function with respect to the current values of the encoder neural network parameters includes, for each of the one or more given observations, for each of the one or more particular observations that are after the given observation in the sequence of observations, obtaining a positive example observation that is representative of the particular observation. The positive example observation is processed using the encoder neural network to generate a positive example latent representation. One or more negative example observations are obtained that are not representative of the particular observation. For each of the one or more negative example observations, the negative example observation is processed using the encoder neural network to generate a respective negative example latent representation. A value of the loss function is determined based on a similarity between the estimate of the latent representation of the particular observation and each of: (i) the positive example latent representation, and (ii) the one or more negative example latent representations.

In some implementations, determining a value of the loss function based on a similarity between the estimate of the latent representation of the particular observation and each of: (i) the positive example latent representation, and (ii) the one or more negative example latent representations, includes determining the value of the loss function based on a ratio of: the similarity between the estimate of the latent representation of the particular observation and the positive example latent representation, and a sum of the respective similarities between the estimate of the latent representation of the particular observation and: (i) the positive example latent representation, and (ii) each of the one or more negative example latent representations.

In some implementations, the similarity between the estimate of the latent representation of the particular observation and the positive example latent representation includes an exponential of a dot product between the estimate of the latent representation of the particular observation and the positive example latent representation.

In some implementations, the similarity between the estimate of the latent representation of the particular observation and a negative example latent representation includes an exponential of a dot product between the estimate of the latent representation of the particular observation and the negative example latent representation.

In some implementations, generating, from the latent representation of the given observation and the latent representations of one or more observations that precede the given observation in the sequence of observations, a context latent representation of the given observation includes processing the latent representation of the given observation and the latent representations of one or more observations that precede the given observation in the sequence of observations using a context neural network in accordance with current values of context neural network parameters to generate the context latent representation of the given observation.

In some implementations, the method further includes determining a gradient of the loss function with respect to the current values of the context neural network parameters, and updating the current values of the context neural network parameters using the gradient.

In some implementations, the context neural network is a recurrent neural network.

According to another aspect there is provided a method including: obtaining a sequence of observations; for each observation in the sequence of observations, processing the observation using an encoder neural network which has been trained using the method of the first aspect to generate a latent representation of the observation; and providing the latent representations of the observations for use in characterizing the sequence of observations.

According to another aspect there is provided a method including obtaining a sequence of observations. For each observation in the sequence of observations, the method includes processing the observation using an encoder neural network which has been trained using the method of the first aspect to generate a latent representation of the observation. The method includes generating, from the latent representation of the observation and latent representations generated for one or more observations that precede the observation in the sequence of observations, a context latent representation of the observation which jointly summarizes the latent representation of the observation and the latent representations generated for one or more observations that precede the observation in the sequence of observations. The context latent representations of the observations are provided for use in characterizing the sequence of observations.

According to another aspect there is provided a system including one or more computers and one or more storage devices storing instructions that when executed by the one or more computers cause the one or more computers to perform the operations of any of the preceding methods.

According to another aspect there are provided one or more computer storage media storing instructions that when executed by one or more computers cause the one or more computers to perform the operations of any of the preceding methods.

Particular embodiments of the subject matter described in this specification can be implemented so as to realize one or more of the following advantages.

This specification describes a training system that trains an encoder neural network on sequences of observations. In particular, for each observation in a sequence, the training system trains the encoder neural network to generate a latent representation of the observation that is predictive of latent representations of subsequent observations in the sequence. In this manner, the training system trains the encoder neural network to generate latent representations which robustly represent generic features in observations without being specialized towards solving a single task (e.g., unlike systems that generate representations that are specialized for being used in object classification for images). At the same time, the latent representations are less likely to characterize low-level information and noise that is more local. Features or information characterizing an observation may be referred to as being "global" if they summarize aspects of the entire observation, and "local" otherwise. For example, in an image, global features or information may characterize the type of an object depicted in the image, while local features and information may characterize the respective colors of a collection of pixels in a region of the image.

Generally, the latent representation of an observation is a compact representation of the observation, i.e., that has a lower dimensionality than the observation. By requiring that the latent representations be predictive in latent space (i.e., the space of latent representations) rather than in observation space (i.e., the space of observations), the training system enables the latent representations to focus on representing global structure in observations rather than noisy local information. Moreover, the training system may consume fewer computational resources (e.g., memory and computing power) than if it trained the encoder neural network to generate latent representations that are predictive in observation space.

The training system can train the encoder neural network using unsupervised learning techniques, that is, on sequences of observations that are not explicitly associated with corresponding labels (e.g., labels that specify phonemes corresponding to a sequence of audio data segments). This makes the training system more broadly applicable because it can train the encoder neural network on large amounts of unlabeled sequence data (i.e., that is far more plentiful than the potentially limited amounts of labeled sequence data).

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system for training an encoder neural network that is configured to process input data to generate a compact (i.e., lower-dimensional) representation of the input data. The input data may be referred to as an "observation", and the compact representation of the observation may be referred to as a "latent" representation. The system trains the encoder network on sequences of observations, e.g., sequences of images from a video, or sequences of audio segments from audio data. In particular, for each observation in a sequence, the system trains the encoder network to generate a latent representation for the observation that is predictive of the latent representations of subsequent observations in the sequence. In this manner, the encoder network learns to generate latent representations that robustly represent generic features in observations, without being specialized towards solving a single supervised task, e.g., unlike systems that generate representations that are specialized for being used in object classification for images. These features and other features are described in more detail below.

Figure 1:
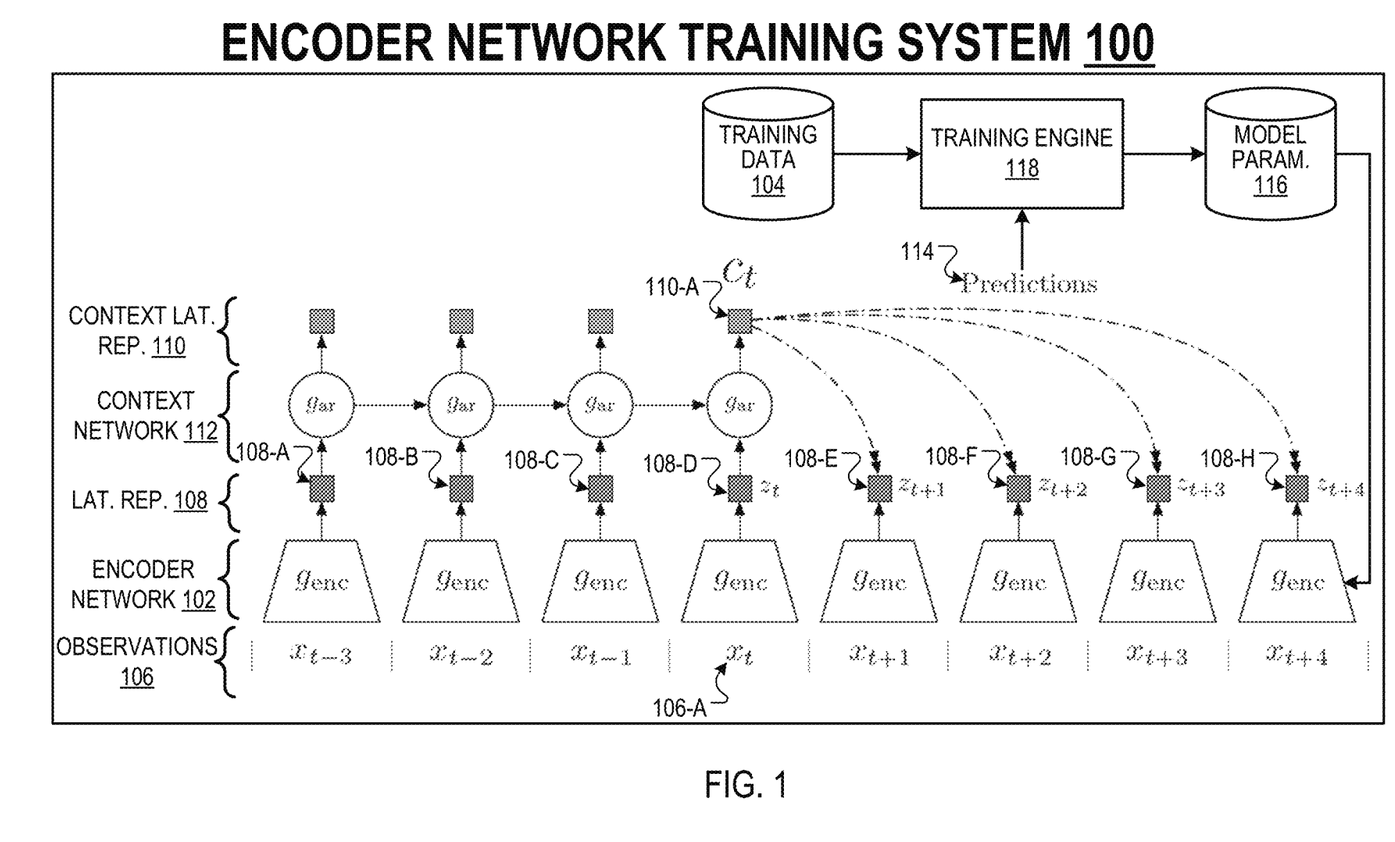
FIG. 1 shows an example encoder network training system.

FIG. 1 shows an example encoder network training system 100. The encoder network training system 100 is an example of a system implemented as computer programs on one or more computers in one or more locations in which the systems, components, and techniques described below are implemented.

The training system 100 trains an encoder neural network 102 that is configured to process an observation (e.g., an audio data segment, an image, or a sentence in a natural language) to generate a latent representation of the observation. The latent representation of an observation can be represented as an ordered collection of numerical values, e.g., a vector or matrix of numerical values, and generally has a lower dimensionality than the observation itself. The encoder neural network can have any neural network architecture that enables it to perform its described function, e.g., a convolutional architecture with residual blocks.

The training system 100 trains the encoder neural network 102 on a set of training data 104 that consists of sequences of observations. Each sequence of observations may be, e.g., a sequence of audio data segments from an audio waveform, a sequence of images of an environment that are captured at respective time points, a sequence of regions from a single image, or a sequence of sentences in a natural language.

To train the encoder neural network 102 on a particular sequence of observations 106 $\{\ldots, x_{t-2}, x_{t-1}, x_t, x_{t+1}, x_{t+2}, \ldots\}$, the training system 100 processes each observation in the sequence (e.g., the observation 106-A) using the encoder neural network 102 to generate corresponding latent representations 108 of the observations (e.g., the latent representation 108-D).

The training system 100 processes the latent representations 108 to generate a respective "context" latent representation 110 for each of one or more of the observations (e.g., the training system generates the context latent representation 110-A for the observation 106-A). The context latent representation for an observation jointly summarizes: (i) the latent representation for the observation, and (ii) the latent representations for one or more preceding observations (and, as with the latent representations, can be represented as an ordered collection of numerical values). The training system 100 may refrain from generating context latent representations 110 for one or more initial observations in the sequence, e.g., the first observation (which is not preceded by any other observations).

The training system 100 can generate the context latent representation for an observation in any of a variety of ways. For example, the training system 100 can generate the context representation for an observation by processing the latent representation for the observation and the latent representations for one or more preceding observations using a context neural network 112. The context neural network 112 can have any appropriate neural network architecture that enables it to perform its described function, e.g., a recurrent neural network architecture (e.g., with gated recurrent units (GRUs)). In one example, the context neural network 112 may be a recurrent neural network that sequentially processes the latent representations of the observations, and the context latent representation of an observation may be identified as the output generated by the context neural network 112 in response to processing the observation. In the example illustrated in FIG. 1, the training system 100 may generate the context latent representation 110-A for the observation 106-A by sequentially processing the latent representations 108-A-108-D using a recurrent context neural network 112.

The training system 100 processes the context latent representation corresponding to an observation to generate predictions 114 for the latent representations of subsequent observations. For example, the training system 100 may process the context latent representation 110-A corresponding to the observation 106-A to generate a respective prediction 114 for each of the latent representations 108-E-108-H. In one example, the training system 100 may process a context latent representation to predict the latent representation of a subsequent observation by applying a linear transformation (e.g., defined by a parameter matrix and a bias vector) to the context latent representation. In a particular example, the training system 100 may process a context latent representation $c_t$ for the observation at position t to generate a prediction $P_{t+k}$ for the latent representation of the observation at position t+k as:

$$P_{t+k} = W_k \cdot c_t \quad (1)$$

where $W_k$ is a parameter matrix specifying a linear transformation. The training system 100 may apply different linear transformations to the context latent representation to generate predictions for the latent representations of different subsequent observations.

In generating predictions 114 for the latent representations of observations subsequent to a given observation, the training system 100 uses only information from the latent representations of the given observation and observations preceding the given observation. That is, the training system 100 tries to predict what happens next in the sequence after the given observation given only information available as of the given observation. In doing so, the training system requires the latent representations representing the information available as of the given observation to be sufficiently predictive of what happens next in the sequence after the given observation.

The training system 100 trains the encoder neural network 102 by updating the current values of its model parameters 116 to encourage the generation of latent representations that are more predictive of subsequent latent representations, i.e., that enable subsequent latent representations to be predicted more accurately. More specifically, the training system 100 uses a training engine 118 to determine gradients of an objective (loss) function that characterizes the accuracy of the predictions 114, and then uses the gradients to adjust the current values of the model parameters 116 of the encoder neural network 102. The training engine 118 may determine the gradients, e.g., using backpropagation techniques, and the training engine 118 may use the gradients to adjust the current values of the model parameters in accordance with any appropriate gradient descent optimization procedure, e.g., RMSprop or Adam. In addition to training the encoder neural network 102, the training system 100 may jointly train: (i) the context neural network 112, and (ii) the parameter values of the transformations applied to the context latent representations to predict the latent representations of subsequent observations.

Generally, the training engine 118 trains the encoder neural network 102 over multiple training iterations. At each training iteration, the training engine 118 may train the encoder neural network 102 on a respective "batch" (set) of sequences of observations sampled from the training data 104.

In some implementations, the training system 100 may train the encoder neural network 102 using a "noise contrastive estimation" (NCE) objective function. To evaluate the NCE objective function $\mathcal{L}$ for a prediction p of a latent representation z, the training system 100 obtains a set $Z^-$ of "negative" latent representations $z^-$ that differ from z, and evaluates the objective function $\mathcal{L}(p)$ as:

$$\mathcal{L}(p) = -\log \frac{S(p, z)}{S(p, z) + \sum_{z^- \in Z^-} S(p, z^-)} \quad (2)$$

where $S(p,z)$ refers a similarity measure between the prediction p and the latent representation z, and each $S(p, z^-)$ refers to a similarity measure between the prediction p and the latent representation $z^-$. The training system 100 may obtain the set $Z^-$ of negative latent representations by randomly sampling "negative" observations from the training data 104 (i.e., that differ from the observation corresponding to the latent representation z being predicted), and processing the negative observations using the encoder neural network 102. The similarity measure $S(p,z)$ may be evaluated as, e.g.:

$$S(p,z) = \exp(p^T z) \quad (3)$$

where $p^T$ refers to the transpose of p. The training system 100 may determine the overall value of the objective function as:

$$\mathcal{L} = \sum_p \mathcal{L}(p) \quad (4)$$

where the sum is over each prediction p of a corresponding latent representation.

Training the encoder neural network in this manner (e.g., as described above) enables it to generate latent representations that encode the underlying shared information between different parts of sequences of observations, while discarding low-level information and noise that is more local. In particular, the encoder neural network may learn to generate latent representations characterizing global features that manifest over multiple observations, e.g., phonemes and intonation in speech (if the observations are audio data segments), objects in an image (if the observations are portions of the image), the story line in a portion of text (if the observations are sentences in the text), or actions being performed over multiple video frames (if the observations are video frames in a video).

Once trained, the encoder neural network can generate latent representations (and context latent representations) that can be used for any of a variety of purposes. For example, latent representations of audio data segments can be used to perform phoneme prediction, grapheme prediction, or speaker identity prediction. As another example, latent representations of the regions of an image can be used to perform object classification (i.e., to predict the type of an object depicted in the image), object detection, object segmentation, image colorization, or image super-resolution. As another example, latent representations of sentences in a portion of text can be used to perform sentiment prediction, e.g., to predict whether a product review has a "positive", "neutral", or "negative" sentiment. As another example, latent representations of observations of an environment can be processed by an action selection neural network to select actions to be performed by an agent interacting with the environment.

Figure 2:
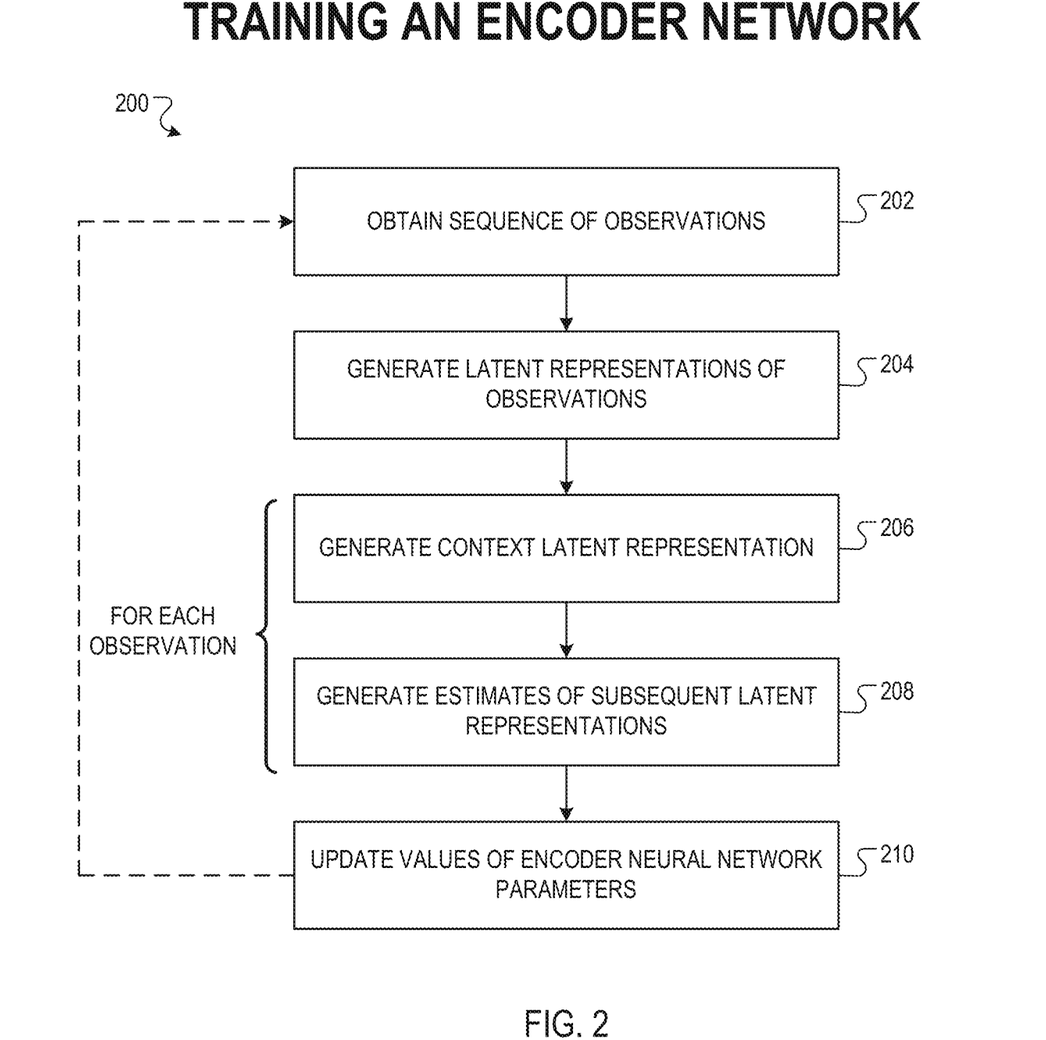
FIG. 2 is a flow diagram of an example process for training an encoder neural network.

FIG. 2 is a flow diagram of an example process 200 for training an encoder neural network. For convenience, the process 200 will be described as being performed by a system of one or more computers located in one or more locations. For example, an encoder network training system, e.g., the encoder network training system 100 of FIG. 1, appropriately programmed in accordance with this specification, can perform the process 200.

The system obtains a sequence of observations (202). The sequence of observations may include a sequence of segments of an audio waveform, a sequence of regions of an image or a sequence of images, or a sequence of sentences in a natural language.

The system processes each observation in the sequence of observations using an encoder neural network to generate a corresponding latent representation of the observation (204). The encoder neural network may include one or more convolutional neural network layers, and the latent representation of an observation may be a compressed representation of the observation.

For each of one or more observations in the sequence, the system generates a context latent representation of the observation (206) and uses the context latent representation to generate estimates of the latent representations of one or more subsequent observations (208). The system may generate the context latent representation of an observation from the latent representation of the observation and the latent representations of one or more preceding observations. The context latent representation of an observation may jointly summarize the latent representation of the observation and the latent representations of the one or more preceding observations. To generate the context latent representation of an observation, the system may process the latent representation of the observation and the latent representations of one or more preceding observations using a context neural network. The context neural network may be a recurrent neural network. To generate an estimate of the latent representation of a subsequent observation from the context latent representation of an observation, the system may identify a prediction parameter matrix based on a number of observations separating the observation and the subsequent observation. The system may then determine the estimate of the latent representation of the subsequent observation as a product between the context latent representation and the prediction parameter matrix.

The system determines a gradient of a loss (objective) function with respect to the current values of the encoder network parameters, and updates the current values of the encoder network parameters using the gradient (210). For each of one or more observations, the loss function characterizes the accuracy of the estimates of the latent representations of the subsequent observations that are generated using the context latent representation of the observation. In some implementations, the loss function may be a noise contrastive estimation (NCE) loss function, e.g., as described with reference to equations (2)-(4).

After updating the current values of the encoder network parameters, the system may return to step 202 and continue training the encoder network by iteratively adjusting the values of its model parameters. After the encoder neural network is trained, it can be used for any of a variety of purposes, e.g., the encoder neural network can be used by a reinforcement learning system to generate latent representations of observations of an environment that are used to select actions to be performed by an agent.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus for training an encoder neural network having a plurality of encoder neural network parameters and that is configured to receive an input observation and to process the input observation in accordance with the encoder neural network parameters to generate a latent representation of the input observation, the method comprising:
   obtaining a sequence of observations;
   for each observation in the sequence of observations, processing the observation using the encoder neural network in accordance with current values of the encoder neural network parameters to generate a latent representation of the observation;
   for each of one or more current observations in the sequence of observations:
      generating, from the latent representation of the current observation and the latent representations of one or more preceding observations that precede the current observation in the sequence of observations, a context latent representation of the current observation, wherein the context latent representation of the current observation jointly summarizes the latent representation of the current observation and the latent representations of the one or more preceding observations that precede the current observation in the sequence of observations;
      processing the context latent representation of the current observation to generate, for each of one or more target observations that are after the current observation in the sequence of observations, a respective predicted latent representation for the target observation;
   determining a gradient of a loss function with respect to the current values of the encoder neural network parameters, wherein for each of the one or more current observations:
      the loss function characterizes, for each of the one or more target observations that are after the current observation in the sequence of observations, an error between: (i) the latent representation of the target observation, and (ii) the predicted latent representation for the target observation; and
   updating the current values of the encoder neural network parameters using the gradient.

2. The method of claim 1, wherein the sequence of observations comprises a sequence of segments of an audio waveform.

3. The method of claim 1, wherein the sequence of observations comprises a sequence of regions of a given image or a sequence of respective images.

4. The method of claim 1, wherein the sequence of observations comprises a sequence of sentences in a natural language.

5. The method of claim 1, wherein:
the encoder neural network is configured for use by a reinforcement learning system to generate latent representations of input observations of an environment which are used to select actions to be performed by the reinforcement learning agent to interact with the environment.

6. The method of claim 1, wherein the encoder neural network comprises one or more convolutional neural network layers, and wherein the latent representation of an observation is a compressed representation of the observation.

7. The method of claim 1, wherein processing from the context latent representation of the current observation to generate, for each of one or more target observations that are after the current observation in the sequence of observations, the respective predicted latent representation for the target observation comprises, for each target observation:
identifying a respective prediction parameter matrix based on a number of observations separating the given current observation and the target observation in the sequence of observations; and
determining a product between the context latent representation of the current observation and the prediction parameter matrix.

8. The method of claim 1, wherein the loss function is a noise contrastive estimation loss function.

9. The method of claim 8, wherein determining the gradient of the loss function with respect to the current values of the encoder neural network parameters comprises, for each of the one or more current observations:
for each of the one or more target observations that are after the current observation in the sequence of observations:
obtaining a positive example observation that is representative of the target observation;
processing the positive example observation using the encoder neural network to generate a positive example latent representation;
obtaining one or more negative example observations that are not representative of the target observation;
for each of the one or more negative example observations, processing the negative example observation using the encoder neural network to generate a respective negative example latent representation; and
determining a value of the loss function based on a similarity between the predicted latent representation of the target observation and each of: (i) the positive example latent representation, and (ii) the one or more negative example latent representations.

10. The method of claim 9, wherein determining the value of the loss function based on the similarity between the predicted latent representation of the target observation and each of: (i) the positive example latent representation, and (ii) the one or more negative example latent representations, comprises:
determining the value of the loss function based on a ratio of:
the similarity between the predicted latent representation of the target observation and the positive example latent representation, and
a sum of the respective similarities between the predicted latent representation of the target observation and: (i) the positive example latent representation, and (ii) each of the one or more negative example latent representations.

11. The method of claim 9, wherein:
the similarity between the predicted latent representation of the target observation and the positive example latent representation comprises an exponential of a dot product between the predicted latent representation of the target observation and the positive example latent representation; and
the similarity between the predicted latent representation of the target observation and a negative example latent representation comprises an exponential of a dot product between the predicted latent representation of the target observation and the negative example latent representation.

12. The method of claim 1, wherein generating, from the latent representation of the current observation and the latent representations of one or more preceding observations that precede the current observation in the sequence of observations, the context latent representation of the current observation comprises:
processing the latent representation of the current observation and the latent representations of one or more preceding observations that precede the current observation in the sequence of observations using a context neural network in accordance with current values of context neural network parameters to generate the context latent representation of the current observation.

13. The method of claim 12, further comprising:
determining a gradient of the loss function with respect to the current values of the context neural network parameters; and
updating the current values of the context neural network parameters using the gradient.

14. The method of claim 12, wherein the context neural network is a recurrent neural network.

15. A system comprising:
one or more computers; and
one or more storage devices communicatively coupled to the one or more computers, wherein the one or more storage devices store instructions that, when executed by the one or more computers, cause the one or more computers to perform operations for training an encoder neural network having a plurality of encoder neural network parameters and that is configured to receive an input observation and to process the input observation in accordance with the encoder neural network parameters to generate a latent representation of the input observation, the operations comprising:
obtaining a sequence of observations;
for each observation in the sequence of observations, processing the observation using the encoder neural network in accordance with current values of the encoder neural network parameters to generate a latent representation of the observation;
for each of one or more current observations in the sequence of observations:
generating, from the latent representation of the current observation and the latent representations of one or more preceding observations that precede the current observation in the sequence of observations, a context latent representation of the current observation, wherein the context latent representation of the current observation jointly summarizes the latent representation of the current observation and the latent representations of the one or more preceding observations that precede the current observation in the sequence of observations;

processing the context latent representation of the current observation to generate, for each of one or more target observations that are after the current observation in the sequence of observations, a respective predicted latent representation for the target observation;

determining a gradient of a loss function with respect to the current values of the encoder neural network parameters, wherein for each of the one or more current observations:

the loss function characterizes, for each of the one or more target observations that are after the current observation in the sequence of observations, an error between: (i) the latent representation of the target observation, and (ii) the predicted latent representation for the target observation; and updating the current values of the encoder neural network parameters using the gradient.

16. The system of claim 15, wherein the sequence of observations includes a sequence of segments of an audio waveform.

17. The system of claim 15, wherein the sequence of observations includes a sequence of regions of a given image or a sequence of respective images.

18. One or more non-transitory computer storage media storing instructions that when executed by one or more computers cause the one or more computers to perform operations for training an encoder neural network having a plurality of encoder neural network parameters and that is configured to receive an input observation and to process the input observation in accordance with the encoder neural network parameters to generate a latent representation of the input observation, the operations comprising:

obtaining a sequence of observations;

for each observation in the sequence of observations, processing the observation using the encoder neural network in accordance with current values of the encoder neural network parameters to generate a latent representation of the observation;

for each of one or more current observations in the sequence of observations:

generating, from the latent representation of the current observation and the latent representations of one or more preceding observations that precede the current observation in the sequence of observations, a context latent representation of the current observation, wherein the context latent representation of the current observation jointly summarizes the latent representation of the given current observation and the latent representations of the one or more preceding observations that precede the current observation in the sequence of observations;

processing the context latent representation of the current observation to generate, for each of one or more target observations that are after the current observation in the sequence of observations, a respective predicted latent representation for the target observation;

determining a gradient of a loss function with respect to the current values of the encoder neural network parameters, wherein for each of the one or more current observations:

the loss function characterizes, for each of the one or more target observations that are after the current observation in the sequence of observations, an error between: (i) the latent representation of the target observation, and (ii) the predicted latent representation for the target observation; and updating the current values of the encoder neural network parameters using the gradient.

19. The non-transitory computer storage media of claim 18, wherein the sequence of observations includes a sequence of segments of an audio waveform.

20. The non-transitory computer storage media of claim 18, wherein the sequence of observations includes a sequence of regions of a given image or a sequence of respective images.

* * * * *